US011765563B2

(12) United States Patent
Zhou et al.

(10) Patent No.: US 11,765,563 B2
(45) Date of Patent: Sep. 19, 2023

(54) METHOD FOR STARTUP CONFIGURATION OF A BLUETOOTH MESH NETWORK

(71) Applicant: ESPRESSIF SYSTEMS (SHANGHAI) CO., LTD., Shanghai (CN)

(72) Inventors: Yizan Zhou, Shanghai (CN); Swee Ann Teo, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 252 days.

(21) Appl. No.: 17/436,831

(22) PCT Filed: Feb. 25, 2020

(86) PCT No.: PCT/CN2020/076632
§ 371 (c)(1),
(2) Date: Sep. 7, 2021

(87) PCT Pub. No.: WO2020/177578
PCT Pub. Date: Sep. 10, 2020

(65) Prior Publication Data
US 2022/0183084 A1  Jun. 9, 2022

(30) Foreign Application Priority Data
Mar. 6, 2019 (CN) .......................... 201910169880.8

(51) Int. Cl.
*H04W 4/50* (2018.01)
*H04W 4/80* (2018.01)
(Continued)

(52) U.S. Cl.
CPC .............. *H04W 4/50* (2018.02); *H04W 4/80* (2018.02); *H04W 8/005* (2013.01); *H04W 8/22* (2013.01);
(Continued)

(58) Field of Classification Search
CPC ..... H04L 67/12–125; H04L 69/24–26; H04W 4/06–80; H04W 8/005–30;
(Continued)

(56) References Cited

U.S. PATENT DOCUMENTS

2008/0205385 A1  8/2008  Zeng et al.
2012/0039190 A1  2/2012  Vasseur
(Continued)

FOREIGN PATENT DOCUMENTS

CN         108738005 A  * 11/2018  .............. H04W 4/50

OTHER PUBLICATIONS

International Search Report from WO 2020/177578 A1 dated May 29, 2020.
(Continued)

*Primary Examiner* — Timothy J Weidner
(74) *Attorney, Agent, or Firm* — Aird & McBurney LP

(57) ABSTRACT

Disclosed in the present disclosure is a method for provisioning a Bluetooth Mesh network, used for provisioning a plurality of non-provisioned devices, so as to add the plurality of non-provisioned devices to the Bluetooth Mesh network. The method includes: provisioning, by a top provisioner, surrounding non-provisioned devices of the top provisioner, so as to add the surrounding devices to the Bluetooth Mesh network as nodes; selecting, by a top provisioner, the one or more newly added nodes to be configured as one or more temporary provisioners; provisioning, by each of the one or more temporary provisioners, surrounding non-provisioned devices, so as to add the surrounding devices to the Bluetooth Mesh network as nodes; and completing, by the top provisioner and each of the one or more temporary provisioners, the provisioning of the plurality of non-provisioned devices. The method of the present disclosure may greatly improve the average provi-
(Continued)

sioning speed of device, and ensure the unified allocation of key network information and the compatibility of provisioning on the premise of ensuring the provisioning security of the Bluetooth Mesh network.

11 Claims, 3 Drawing Sheets

(51) Int. Cl.
| | |
|---|---|
| H04W 8/00 | (2009.01) |
| H04W 8/22 | (2009.01) |
| H04W 8/26 | (2009.01) |
| H04W 12/00 | (2021.01) |
| H04W 12/043 | (2021.01) |
| H04W 12/08 | (2021.01) |
| H04W 12/55 | (2021.01) |
| H04W 40/24 | (2009.01) |
| H04W 40/32 | (2009.01) |
| H04W 48/06 | (2009.01) |
| H04W 48/08 | (2009.01) |
| H04W 48/16 | (2009.01) |
| H04W 48/18 | (2009.01) |
| H04W 76/10 | (2018.01) |
| H04W 76/14 | (2018.01) |
| H04W 76/23 | (2018.01) |
| H04W 76/40 | (2018.01) |
| H04W 84/00 | (2009.01) |
| H04W 84/18 | (2009.01) |
| H04W 88/02 | (2009.01) |
| H04W 88/08 | (2009.01) |
| H04W 92/02 | (2009.01) |
| H04W 92/10 | (2009.01) |
| H04W 92/18 | (2009.01) |

(52) U.S. Cl.
CPC .......... *H04W 8/26* (2013.01); *H04W 12/009* (2019.01); *H04W 12/043* (2021.01); *H04W 12/08* (2013.01); *H04W 12/55* (2021.01); *H04W 40/244* (2013.01); *H04W 40/246* (2013.01); *H04W 40/248* (2013.01); *H04W 40/32* (2013.01); *H04W 48/06* (2013.01); *H04W 48/08* (2013.01); *H04W 48/16* (2013.01); *H04W 48/18* (2013.01); *H04W 76/10* (2018.02); *H04W 76/14* (2018.02); *H04W 76/23* (2018.02); *H04W 76/40* (2018.02); *H04W 84/005* (2013.01); *H04W 84/18* (2013.01); *H04W 88/02* (2013.01); *H04W 88/08* (2013.01); *H04W 92/02* (2013.01); *H04W 92/10* (2013.01); *H04W 92/18* (2013.01)

(58) Field of Classification Search
CPC ... H04W 12/009–80; H04W 24/02–10; H04W 40/005–38; H04W 48/02–20; H04W 60/005–06; H04W 76/10–50; H04W 80/02–12; H04W 84/005–22; H04W 88/005–188; H04W 92/02–24
See application file for complete search history.

(56) References Cited

U.S. PATENT DOCUMENTS

| | | | |
|---|---|---|---|
| 2017/0295455 A1 | 10/2017 | Kwon | |
| 2019/0200193 A1* | 6/2019 | Bae | H04W 4/50 |
| 2020/0169861 A1* | 5/2020 | Hu | H04W 4/80 |

OTHER PUBLICATIONS

Office Action and Search Report from corresponding Chinese Application No. 2019101698808 dated Apr. 22, 2020.

* cited by examiner

METHOD FOR STARTUP CONFIGURATION OF A BLUETOOTH MESH NETWORK

TECHNICAL FIELD

The present disclosure relates to a Bluetooth Mesh network, and in particular to a method for provisioning a Bluetooth Mesh network.

BACKGROUND ART

A member device in a Bluetooth Mesh network is called a "node", while a device that has not yet been added to the network is called a "non-provisioned device". The non-provisioned device is added to the Bluetooth Mesh network by means of the security process of "provisioning", which will transform an ordinary "non-provisioned device" into a "node" and make it officially become a member of the Bluetooth Mesh network.

The device that performs the provisioning operation is called a "provisioner", which is very demanding of security because of its vital role. Usually, a user is required by the provisioning process to provision the non-provisioned devices one by one on one provisioner (e.g., a smart phone or a tablet computer) by means of an application program, so as to implement the provisioning of the whole network, instead of letting each non-provisioned device automatically access the network. The main reasons for doing so are as follows:

1. If all the non-provisioned devices may automatically access the network without being operated one by one by a user for authorization, other devices that are not trusted by users may easily join the network and obtain some private information of the network (e.g., network key), thus making the network not secure enough;
2. A display screen, which may facilitate a user to complete the complicated network provisioning operation process, may not be provided for ordinary Internet of Things (IoT) devices; hence, a smart device such as a smart phone or a tablet computer is usually selected as a provisioner;
3. Some information in a Bluetooth Mesh network (which is an important part of the Bluetooth Mesh network provisioning information) should be uniformly distributed and managed, for example:
   (1) each node in the same Bluetooth Mesh network must use the same network key, so that the nodes in the same network may communicate with each other and pass messages to each other;
   (2) each element of each node in the same Bluetooth Mesh network must have a unique unicast address, and unicast addresses of different elements of different nodes in the same Bluetooth Mesh network cannot be duplicated, hence one provisioner should be provided to uniformly allocate addresses;
   (3) the same Bluetooth Mesh network contains one unified IV index, which is used as a part of Nonce (authentication random number) and an extension part of SEQ (Sequence Number) when encrypting messages to make the SEQ not duplicated; and
   (4) all messages except Configuration messages in the same Bluetooth Mesh network should be encrypted with application key, and the application key available to each node are allocated by a provisioner.

For the above reasons, in most of the current provisioning processes, the non-provisioned devices shall be configured one by one by means of one provisioner. However, it is found that the existing provisioning methods have at least the following defects when in use:

1. It is inefficient to use one provisioner to complete the provisioning operation of all the non-provisioned devices, especially when the network is very large, for example, when hundreds of devices should be provisioned, it often takes a very long time to complete the provisioning work.

For example, given it takes 3 s (seconds) to complete the provisioning operation of one device, and then it takes 50 min (minutes). to complete the provisioning work of 1,000 devices, which is a very poor experience for users.

2. Currently, most smart phones only support the network provisioning by means of a PB-GATT (Provisioning over Bearer-Generic Attribute Profile) bearer rather than a PB-ADV (Provisioning over Bearer-Advertising) bearer. Therefore, the non-provisioned device that does not support a PB-GATT bearer cannot join the network when such a smart phone is used as a provisioner.

Thus, it can be seen that the type of non-provisioned device supported by the network depends heavily on the provisioning bearer supported by the provisioner itself, thus reducing the compatibility of Bluetooth Mesh network that may be provisioned by the provisioner.

Further, in the above provisioning process by means of a PB-GATT bearer, the provisioner needs to discover a device by means of Bluetooth scanning and establish a connection thereto, which will increase the time consumption of provisioning.

3. Due to limited communication distance of the provisioner, only the non-provisioned device within own communication distance may be provisioned. However, in terms of the non-provisioned device outside the communication distance range, the provisioner should be moved constantly, so that the non-provisioned device may also enter the communication distance range and thus can be provisioned. Therefore, such an operation is troublesome.

4. Even if all the non-provisioned devices are within the communication distance range of the provisioners, no effective and fast provisioning solution has been put forward in the prior art to achieve the provisioning of a large number of devices in a dense network. The dense network may be, for example, a network where all devices or a large number of devices are within a one-hop range.

Therefore, a solution for provisioning the Bluetooth Mesh network is needed in the art, which has at least one or more of the following expected benefits: achieving fast and safe provisioning of a large number of non-provisioned devices, providing compatibility to the provisioners only supporting a PB-GATT bearer and the non-provisioned devices only supporting a PB-ADV bearer, reducing unnecessary movement of the provisioners during provisioning, and achieving fast and safe provisioning even in a dense network. It should be understood that the technical problems listed above are only examples rather than restrictions on the present disclosure, and the present disclosure is not limited to the technical solutions for solving all of the above-described technical problems at the same time. The technical solutions of the present disclosure may be implemented to solve one or more of the above-described or other technical problems.

SUMMARY OF THE INVENTION

To achieve the above object, the present disclosure provides a method for provisioning a Bluetooth Mesh network, which is used for provisioning a plurality of non-provisioned devices, so as to add the plurality of devices to the Bluetooth Mesh network. The method for provisioning a Bluetooth Mesh network of the present disclosure includes the following steps: (a) provisioning, by a top provisioner, surrounding non-provisioned devices of the top provisioner, so as to add the surrounding non-provisioned devices to the Bluetooth Mesh network as nodes; (b) selecting, by the top provisioner, one or more newly added nodes in step (a) to be configured as one or more temporary provisioners; (c) continuing to perform, by the top provisioner, steps (a) to (b) to process other surrounding non-provisioned devices; (d) after determination of the one or more temporary provisioners according to step (b), provisioning, by each of the one or more temporary provisioners, surrounding non-provisioned devices of each of the temporary provisioners, so as to add the surrounding non-provisioned devices of each of the one or more temporary provisioners to the Bluetooth Mesh network as nodes; (e) selecting, by each of the temporary provisioners, one or more newly added nodes in step (d) to be configured as temporary provisioners of a next level; and (f) repeating steps (d) to (e) for each of the one or more temporary provisioners until the completion of the provisioning of the plurality of non-provisioned devices.

Optionally, after the completion of the provisioning of all surrounding non-provisioned devices thereof, each temporary provisioner reports provisioning information of all nodes provisioned by the temporary provisioner to the top provisioner, and the temporary provisioner is converted into an ordinary Bluetooth Mesh node.

Optionally, in step (b), a temporary provisioner provisioned by the top provisioner and supporting a PB-ADV bearer is designated as a primary provisioner;

after the completion of the provisioning of all surrounding non-provisioned devices thereof, each temporary provisioner reports provisioning information of all nodes provisioned by the temporary provisioner to the primary provisioner, and the temporary provisioner is converted into an ordinary Bluetooth Mesh node; and after completion of the provisioning of the plurality of non-provisioned devices, the primary provisioner sends summarized provisioning information of all nodes to the top provisioner and the primary provisioner is converted into an ordinary Bluetooth Mesh node.

Optionally, the top provisioner provisions the primary provisioner by means of a PB-GATT bearer or a PB-ADV bearer, and/or the primary provisioner provisions the non-provisioned devices by means of the PB-GATT bearer or the PB-ADV bearer.

Optionally, the top provisioner provisions the primary provisioner by means of a PB-GATT bearer, and the primary provisioner provisions the non-provisioned devices by means of a PB-ADV bearer.

Optionally, before step (a), device identity information of the plurality of non-provisioned devices is registered with the top provisioner; and in step (a) and step (d), only the registered non-provisioned devices are provisioned.

Optionally, registering device identity information of the plurality of non-provisioned devices with the top provisioner includes one or more the following steps: manually adding Device UUID information of the non-provisioned device to the top provisioner; arranging the top provisioner near the non-provisioned device to obtain the Device UUID information by scanning; and storing, in the top provisioner, the specified pattern to which Device UUID of the non-provisioned device conform, and taking the non-provisioned device whose Device UUIDs conform to the specified pattern as the registered non-provisioned devices.

Optionally, the top provisioner sends configuration information to a newly added node, so as to configure the node as the temporary provisioner in step (b); and sending, by the temporary provisioner, configuration information to the newly added node, so as to configure the node as the temporary provisioner in step (d); wherein the configuration information includes identity information of the plurality of non-provisioned devices and/or a set of unicast addresses allocatable by the node, and wherein the set of unicast addresses allocatable by the node is one of a plurality of disjoint subsets of a set of unicast addresses allocatable by an upper-level provisioner of the node.

Optionally, the top provisioner allocates a set of allocatable unicast addresses equally to the one or more temporary provisioner provisioned by the top provisioner; and/or the temporary provisioner allocates a set of allocatable unicast addresses equally to the temporary provisioner of the next level provisioned by the temporary provisioner.

Optionally, the top provisioner allocates ½ (a half) of the set of currently allocatable unicast addresses to a temporary provisioner each time the temporary provisioner is provisioned; and/or the temporary provisioner allocates ½ of the set of currently allocatable unicast addresses to a temporary provisioner of a next level each time the temporary provisioner of the next level is provisioned.

Optionally, when a plurality of temporary provisioners, or the top provisioner and one or more temporary provisioners, initiate provisioning to a same non-provisioned device, the non-provisioned device determines a corresponding provisioner according to one or more of the following: the time when the provisioning is initiated; and signal strength of the provisioner.

Therefore, in accordance with the method for provisioning a Bluetooth Mesh network of the present disclosure, the average provisioning speed of devices is greatly improved on the premise of ensuring the provisioning security of the Bluetooth Mesh network, which is especially suitable for the situation where a large number of devices are to be provisioned.

In addition, the present disclosure allows for the registration of the non-provisioned device prior to the provisioning, so as to ensure the security of provisioning. The present disclosure also takes into account the diversity of provisioners used by users, and ensures the compatibility of types of the non-provisioned devices by providing one or more temporary provisioners between the top provisioner and the non-provisioned device; that is, types of the devices that may no longer depend on the top provisioner, and the problem of that the configuration speed and effect are influenced due to limited performance of the top provisioner is avoided.

BRIEF DESCRIPTION OF THE DRAWINGS

Hereinafter, the present disclosure will be further explained with reference to embodiments and accompanying drawings.

DETAILED DESCRIPTION OF THE PREFERRED EMBODIMENTS

The method of the present disclosure may be described in detail with reference to the accompanying drawings and specific embodiments. It should be understood that the embodiments shown in the accompanying drawings and described below are merely illustrative and not restrictive on the present disclosure.

Figure 1:
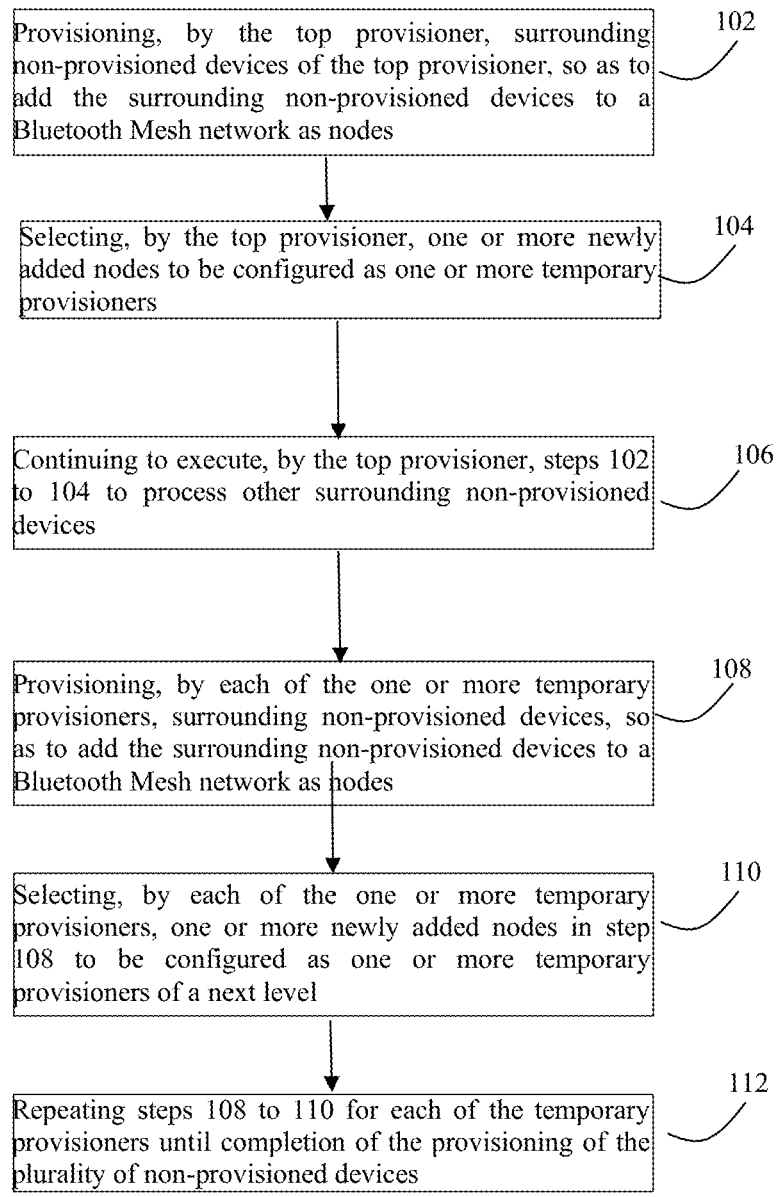
FIG. 1 schematically shows a flow chart of a method for provisioning a Bluetooth Mesh network in accordance with one embodiment of the present disclosure.

FIG. 1 illustrates a flow chart of a method for provisioning a Bluetooth Mesh network in accordance with one embodiment of the present disclosure.

In step 102, a top provisioner provisions its surrounding non-provisioned devices, so as to add the surrounding devices to a Bluetooth Mesh network as nodes.

In step 104, the top provisioner selects one or more newly added nodes in step 102 to be configured as one or more temporary provisioners. It should be understood that a node joined a Bluetooth Mesh network may not automatically become a provisioner. In addition, if there exist two provisioners operating independently and simultaneously in the same Bluetooth Mesh network according to the standard Bluetooth Mesh protocol, many problems such as address allocation conflicts may arise. Hence, in this step, the top provisioner selects and provisions a newly added node that can operate as a provisioner, so as to make the node be a temporary provisioner. As detailed below, the temporary provisioner may perform the provisioning operation according to the standard Bluetooth Mesh protocol, and may cooperate with the top provisioner without causing address allocation conflicts.

In step 106, the top provisioner continues to execute steps 102 to 104 to process its other surrounding non-provisioned devices.

In step 108, after the determination of the one or more temporary provisioners according to step 104, each of the one or more temporary provisioners provisions its surrounding non-provisioned devices, so as to add its surrounding devices to the Bluetooth Mesh network as nodes.

In step 110, each of the temporary provisioners selects one or more newly added nodes in step 108 to be configured as temporary provisioners of a next level.

In step 112, steps 108 to 110 are repeated for each of the one or more temporary provisioners until the completion of the provisioning of the plurality of non-provisioned devices.

It should be understood that the provisioning operations performed by the top provisioner and each temporary provisioner are independent of each other. That is, the top provisioner and various temporary provisioners may perform provisioning operations parallelly and simultaneously. Similarly, the provisioning operations may also be performed by each temporary provisioner in parallel.

Figure 2:
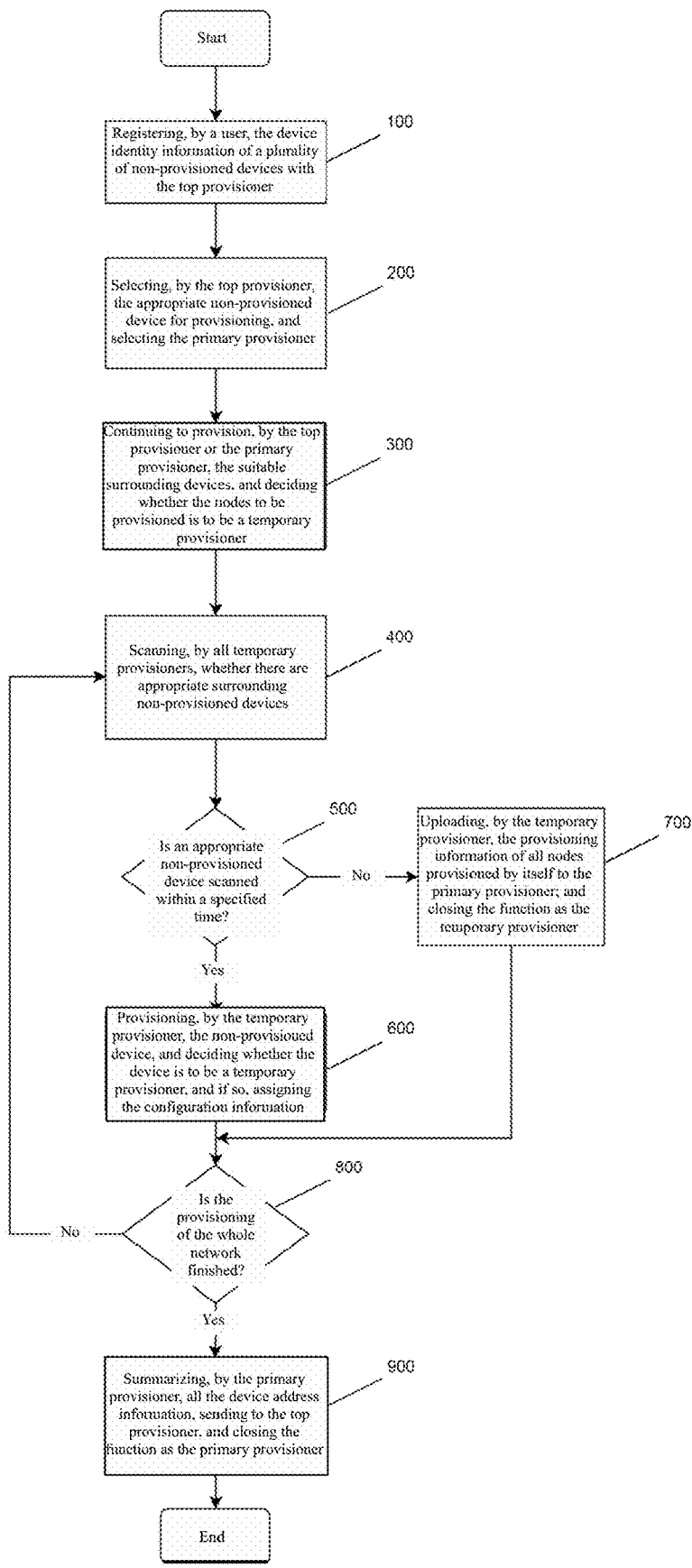
FIG. 2 schematically shows a flow chart of a method for provisioning a Bluetooth Mesh network in accordance with one specific embodiment of the present disclosure.
Figure 3:
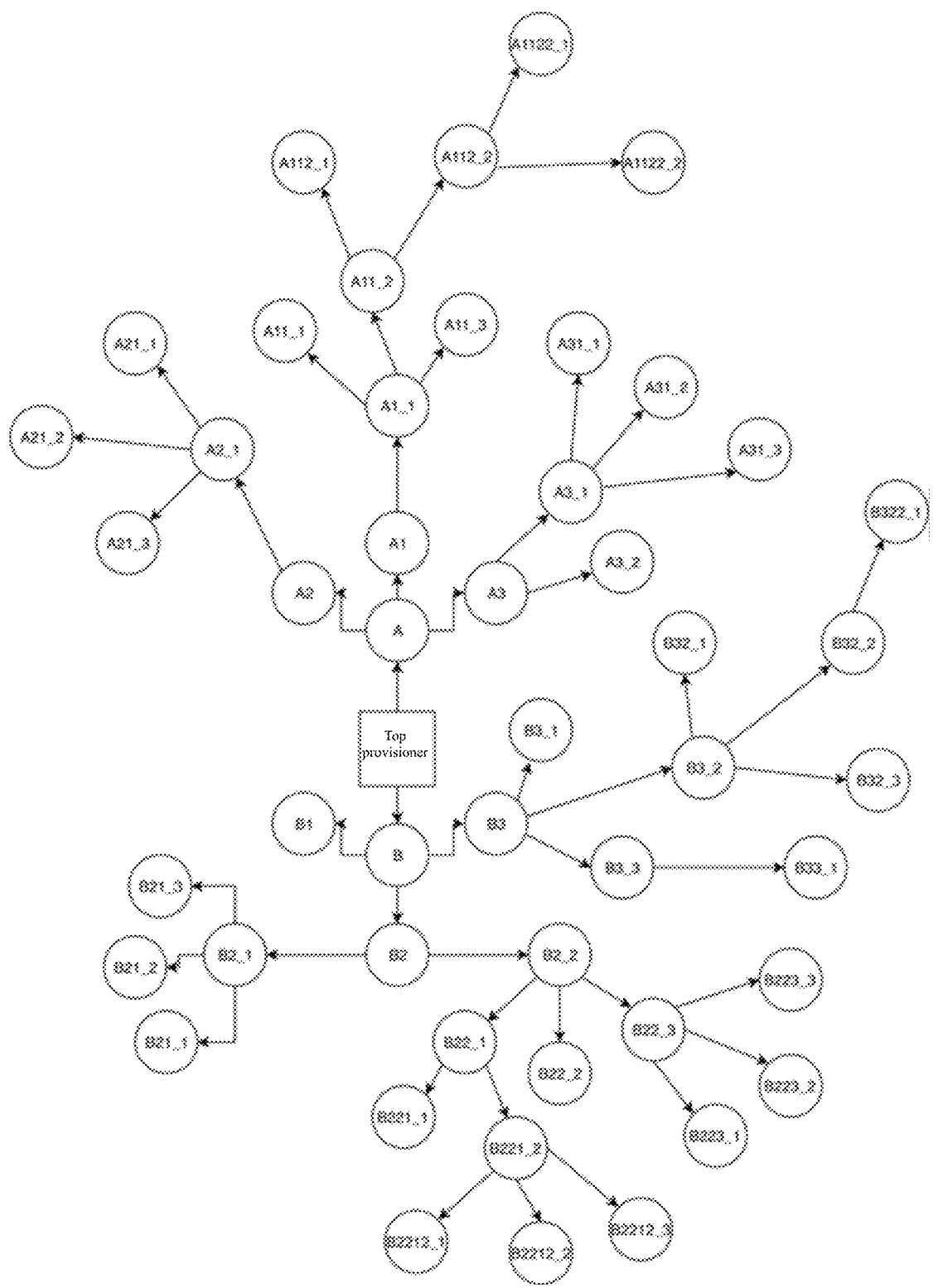
FIG. 3 schematically shows a network diagram of achieving the provisioning of a Bluetooth Mesh network by means of a method for provisioning of a Bluetooth Mesh network in accordance with one embodiment of the present disclosure.

FIG. 3 shows a network diagram of achieving the provisioning of a Bluetooth Mesh network by means of a method for provisioning a Bluetooth Mesh network in accordance with one embodiment of the present disclosure, where the non-provisioned devices are as follows: A, A1, A2, A3, A1_1, A11_1, A11_2, A11_3, A112_1, A112_2, A1122_1, A1122_2, A2_1, A21_1, A21_2, A21_3, A3_1, A3_2, A31_1, A31_2, A31_3, B, B1, B2, B3, B2_1, B2_2, B21_1, B21_2, B21_3, B22_1, B22_2, B22_3, B221_1, B221_2, B2212_1, B2212_2, B2212_3, B223_1, B223_2, B223_3, B3_1, B3_2, B3_3, B32_1, B32_2, B32_3, B322_1, B33_1. In this embodiment, FIG. 2 shows a flow chart of an exemplary Bluetooth Mesh network provisioning method according to the present disclosure. The Bluetooth Mesh network provisioning method according to this embodiment of the present disclosure will be described below with reference to FIG. 2 and FIG. 3, and specifically includes steps 100 to 900 as follows.

In step 100, device identity information of the plurality of non-provisioned devices is registered with the top provisioner.

In the method for provisioning a Bluetooth Mesh network of the present disclosure, optionally, the non-provisioned device may be pre-registered as required. Specifically, a user may register the device identity information of the non-provisioned device with the provisioner, in particular, the information may include the ID information of the device. In one embodiment of the present disclosure, only the registered non-provisioned device is to be provisioned, thus avoiding adding an unauthorized non-provisioned device to the Bluetooth Mesh network.

In the present disclosure, the provisioner used by the user is not limited, and may be, for example, a smart phone, a tablet computer and the like. The provisioner may also be a device that supports the provisioning of non-provisioned device in a PB-ADV bearer, a device that supports the provisioning of non-provisioned device in a PB-GATT bearer, and a device that supports the provisioning of non-provisioned device in both a PB-ADV bearer and a PB-GATT bearer.

In this specification, the provisioner used by the user is called "top provisioner".

In this step, the present disclosure provides the following approaches for registering device identity information of a plurality of non-provisioned devices with the top provisioner.

According to the first approach, the device identity information of the non-provisioned device is manually added to the top provisioner. Preferably, the information may be the Device UUID information.

For example, a two-dimensional code, e.g., QR (Quick Response) code, is usually disposed on the packaging box of the non-provisioned device for storing ID information of the device such as the Device UUID. It should be understood that the implementation of the present disclosure is not limited thereto, and other ID information for identifying the device without departing from the scope of the present disclosure may be used. Therefore, in step 100, the user may scan the two-dimensional codes on the packaging boxes of all the non-provisioned devices by the top provisioner (e.g., a smart phone, a tablet computer and other devices with optional functions of scanning and reading two-dimensional codes), so as to register the device identity information of each non-provisioned device with the top provisioner.

This approach is especially suitable for the condition that each non-provisioned device is not installed, at this time, the user may easily obtain the packaging boxes of each non-provisioned device uniformly stacked in one or several places, so as to easily and quickly obtain the device identity information of each non-provisioned device by means of the two-dimensional code on the packaging box.

According to the second approach, the top provisioner is arranged near the non-provisioned device to scan device identity information of the device. Preferably, the information may be the Device UUID information.

Specifically, the user approaches and registers the non-provisioned device one by one by the top provisioner. For example, when approaching a non-provisioned device and determining the device as one that he or she intends to provision, the user may manually check the non-provisioned device on the display screen of the top provisioner. By repeating the above processes, the user may register device identity information of these devices with the top provisioner after checking all the non-provisioned devices at once.

Since the user is required to check each non-provisioned device one by one, the approach is more suitable for a Bluetooth Mesh network with few nodes or with a network node layout being not too large (i.e., a Bluetooth Mesh network with few non-provisioned devices). It should be understood that the implementation of the present disclosure is not limited to the pattern, and the device to be registered may be selected in other ways.

According to the third approach, the designated pattern of the device identity information (e.g., Device UUID) of the non-provisioned device is stored in the top provisioner, and the non-provisioned device whose Device UUIDs conform to the designated pattern is regarded as the registered non-provisioned devices.

In one embodiment, the Device UUID of the non-provisioned device may be encrypted by a specified rule, and thus the top provisioner may verify the identity of the non-provisioned device by means of the Device UUID of the non-provisioned device.

For example, each vendor may maintain a set of custom key, and when generating the Device UUID (16 bytes), a random 8-byte data is generated firstly by the specified rules, which is not completely random and contains some fixed bytes to identify the device of this vendor; then, the 8-byte random value and the vendor's custom key are used as the encryption input, and the encrypted result (i.e., the encrypted 8-byte data) is spliced with the original 8-byte random value to form a complete Device UUID. For example, the first 8 bytes are unencrypted random data, and the last 8 bytes are encrypted data.

Therefore, when registering the device identity information of each non-provisioned device, the top provisioner only should register the custom key information of this vendor and the features of the first 8-byte random data without a need of registering Device UUID of all devices one by one. The reason lies in that, when scanning and obtaining the Device UUID of a certain non-provisioned device, if the top provisioner finds that the first 8 bytes (i.e., unencrypted data) of the Device UUID meet the vendor's rules and the last 8-byte data are encrypted by this custom key according to the first 8-byte data, the device may be confirmed as the non-provisioned device which need to be provisioned.

Additionally, some vendor's feature information may be added to random data of the first 8 bytes, so as to avoid decrypting all scanned and obtained Device UUID and consuming a large number of resources required for decrypting all Device UUID.

In another embodiment, when some bytes in the Device UUID of the non-provisioned device meet the specified features, the non-provisioned device is confirmed to be the device needing to be provisioned in this Bluetooth Mesh network. For example, all the non-provisioned devices that contain the Device UUID beginning with 0x1314 in the network may be regarded as the devices needing to be provisioned in this network.

It can be seen that the approach is highly efficient by transmitting an ordinary part of the Device UUID rather than transmitting a large amount of address information to the top provisioner.

However, it can be seen that the security of this approach is not as high as that of the previous two approaches because of the lack of the user's independent selection process. For example, an imposter who uses Device UUID beginning with 0x1314 may be mistakenly added to the Bluetooth Mesh network. Therefore, this approach may be applied to application scenarios with security requirements being not high, such as some lamp application scenarios. In such an application scenario, even if a device is mistakenly accessed to the Bluetooth Mesh network, the user may kick out the device and change the network key.

In addition, the received signal strength indication (RSSI) of the non-provisioned device may also be regarded as one of the features to determine whether the non-provisioned device is correct or not. When the received signal strength indication of a certain non-provisioned device meets the specified conditions, for example, within the specified range, the device may be confirmed as a candidate non-provisioned device.

It should be noted that the user may select one of the above approaches according to the actual scenarios and requirements, or use two or three of the above approaches in combination, to complete the step of registering device identity information of a plurality of non-provisioned devices with the top provisioner.

It should be understood that the device registration scheme provided by the present disclosure may significantly reduce the security risk of provisioning unauthorized devices, and at the same time, users are not required to manually register each device cumbersomely.

In step 200, the top provisioner selects an appropriate non-provisioned device, and optionally selects the device as the primary provisioner after the completion of provisioning. In this step, the top provisioner starts to provision its surrounding (i.e., within respective communication distance range) non-provisioned devices. As shown in FIG. 3, the top provisioner may provision the surrounding devices A and B to be provisioned at first.

Specifically, as mentioned above, the technical solution of the present disclosure does not restrict the top provisioner used by the user; therefore, one primary provisioner may be first determined by means of the top provisioner in step 200 to prevent the impact of using different top provisioners (e.g., different smart phones, tablet computers, etc.) on the provisioning speed of Bluetooth Mesh network. Optionally, the primary provisioner has stronger provisioning performance and compatibility than the top provisioner. In one embodiment, the primary provisioner may be configured to be specifically optimized to make it more suitable than commonly used top provisioners (e.g., mobile phones and tablet computers) for executing the provisioning function in a Bluetooth Mesh network. In particular, the primary provisioner may be configured to efficiently receive and summarize the provisioning information sent by other devices, thereby assisting the top provisioner in completing the provisioning of a Bluetooth Mesh network more efficiently.

The primary provisioner may be understood as a special temporary provisioner. For example, the primary provisioner may be provided with all functions of the temporary provisioner, and additionally receive the summarized provisioning information of the provisioned nodes as a substitute of the top provisioner for most of the time during the provisioning process of the whole Bluetooth Mesh network. In a non-limiting example, the primary provisioner may be the first temporary provisioner determined by the top provisioner. Preferably, the top provisioner may provision the primary provisioner by means of a PB-GATT bearer or a PB-ADV bearer, and the primary provisioner may also provision the non-provisioned device by means of a PB-GATT bearer or a PB-ADV bearer, preferably the PB-ADV bearer.

In one embodiment, the primary provisioner may not completely replace the top provisioner, but undertake part of the work of the top provisioner in the provisioning stage, for example, the primary provisioner may work with the top provisioner to provision a Bluetooth Mesh network, thereby reinforcing the top provisioner and improving the provisioning speed and efficiency, especially in the condition that the performance of the top provisioner is limited.

Therefore, as an example rather than a limitation, the selection of the primary provisioner by the top provisioner may be based on one or more of the following considerations:

1. A node with higher RSSI (Received Signal Strength Indication) is selected as a primary provisioner;
2. A device that may be provisioned by means of a PB-GATT bearer is selected as a primary provisioner if the top provisioner used cannot be provisioned by means of a PB-ADV bearer;
3. The primary provisioner may preferably support an advertising bearer; thereby conveniently receiving information sent by other nodes in a Bluetooth Mesh network without using a Proxy function.

For example, the user may prioritize the provisioning of the non-provisioned device B, so that the device may be added to a Bluetooth Mesh network and selected as a primary provisioner. It should be understood that the scheme of automatically selecting the primary provisioner is also included in the scope of the present disclosure.

Specifically, in step 200, the user manually selects the non-provisioned device B from the list of non-provisioned devices obtained in step 100. First, the top provisioner executes the provisioning process on the non-provisioned device B, so that the device may be preferentially added to the Bluetooth Mesh network as a node in the network. The provisioning process of the non-provisioned device B complies with the standard Bluetooth Mesh provisioning process, thus ensuring the security and reliability of the whole provisioning process and the compatibility with other nodes supporting the Bluetooth Mesh network.

After the above non-provisioned device B is provisioned by the top provisioner, it becomes the primary provisioner B according to the user's choice after joining the Bluetooth Mesh network (hereinafter known as the primary provisioner B).

Next, the top provisioner may continue to provision one or more of other non-provisioned devices, and the top provisioner can of course also stop the provisioning operation and make the primary provisioner B provision other non-provisioned devices. See step 300 for details.

In step 300, the top provisioner and/or the primary provisioner continues to execute the provisioning process of the surrounding non-provisioned devices, and decide whether the node that is successfully provisioned is selected as a temporary provisioner.

In this embodiment, the top provisioner as well as the primary provisioner B selected and determined in step 200 continues to provision the surrounding non-provisioned devices.

Specifically, the top provisioner firstly sends the configuration information required for provisioning each non-provisioned device to the primary provisioner B. In step 200, the primary provisioner B has joined the Bluetooth Mesh network and obtained a node address (i.e., unicast address, which is determined and allocated to the primary provisioner B by the top provisioner); hence, the above configuration information may be safely transmitted to the primary provisioner B by the top provisioner via the Bluetooth Mesh network.

If the top provisioner used does not support the communication with the primary provisioner B by means of a broadcast bearer, it may communicate with the primary provisioner B in the Bluetooth Mesh network by means of a GATT bearer.

The above configuration information may include the device identity information (especially the device ID information, e.g. the Device UUID information) and/or a set of unicast addresses allocatable by each non-provisioned device, wherein the device identity information of each non-provisioned device is the device identity information obtained by the top provisioner in step 100; the set of unicast addresses allocatable by the primary provisioner B is the set of unicast address that is provided by the top provisioner to the primary provisioner B and is allocatable by the primary provisioner B to the non-provisioned devices. After provisioning one or more temporary provisioners of the next level, the primary provisioner B may further allocate the set of allocatable unicast addresses to the one or more temporary provisioners of a next level. The approach to determine the set of allocatable unicast addresses will be described in detail later.

In addition, the above configuration information may optionally include some additional configuration information such as a network key and an application key. If necessary, the additional configuration information may also be sent to the primary provisioner B.

Next, the primary provisioner B that has received the above configuration information may be together with the top provisioner to provision the non-provisioned device.

Specifically, as shown in FIG. 3, the top provisioner provisions its surrounding non-provisioned device A, so as to add the surrounding device to the Bluetooth Mesh network to determine the node address (i.e., unicast address) in the Bluetooth Mesh network. Preferably, while the top provisioner provisions the non-provisioned device A, the primary provisioner may also provision its surrounding devices B1, B2 and B3 to be provisioned, and add its surrounding devices to the Bluetooth Mesh network one by one to determine respective node addresses in the Bluetooth Mesh network for them. In addition, as mentioned above, the primary provisioner B may preferably support a PB-ADV bearer, and thus may preferably provision other non-provisioned devices by means of the PB-ADV bearer.

In this embodiment, in step 300, a temporary provisioner may be further selected and determined to undertake part of the work of the top provisioner and/or the temporary provisioner B.

As shown in FIG. 3, the top provisioner determines the device A that has been provisioned thereby and joined a Bluetooth Mesh network as a temporary provisioner (hereinafter known as the temporary provisioner A), and the primary provisioner B determines that the device B2 which has already been provisioned thereby and joined the Bluetooth Mesh network as a temporary provisioner (hereinafter known as the temporary provisioner B2).

The temporary provisioners A and B2 may be selected based on similar consideration of selecting the primary provisioner B described earlier. Preferably, the temporary provisioner supports a PB-ADV bearer or both PB-ADV bearer and PB-GATT bearer.

In addition, similar to the configuration information transmitted by the top provisioner to the primary provisioner B described above, the top provisioner transmits the configuration information to the temporary provisioner A, which includes the device identity information (especially ID information) of each non-provisioned device and/or a set of unicast addresses allocatable by the temporary provisioner A, and further includes additional configuration information as described above. The primary provisioner B transmits the configuration information to the temporary provisioner B2, which includes the device identity information (especially the ID information) of each non-provisioned device and/or a set of unicast addresses allocatable by the temporary provisioner B2, and may also include additional configuration information as described above.

Therefore, the temporary provisioners A and B2 may provision their surrounding non-provisioned devices, i.e., the devices A1, A2, A3, B2_1 and B2_2 to be provisioned. Moreover, the temporary provisioner may also select and determine a temporary provisioner of the next level and transmit the configuration information thereto. For example, in an embodiment shown in FIG. 3, the device B2_2 is selected and determined as a temporary provisioner of the next level of the temporary provisioner B2 (hereinafter known as the temporary provisioner B2_2), and receives the configuration information transmitted by the temporary provisioner B2. See steps 400 to 800 below for details.

In addition, other devices that have already been provisioned and accessed to the Bluetooth Mesh network, such as devices B1 and B3, are not selected as temporary provisioners, but only serve as ordinary nodes in the Bluetooth Mesh network to undertake the work of sending and receiving information and forwarding information. Therefore, these devices will be considered Bluetooth Mesh nodes B1 and B3 respectively hereinafter.

The approaches to determine the set of allocatable unicast addresses in the present disclosure are described in detail below.

In the present disclosure, two approaches to determine the set of allocatable unicast address are provided, wherein the first approach is an equal-allocation-based approach, and the second approach is a dichotomy-based approach. The implementation details of these two approaches are described in detail by way of an example of provisioning three non-provisioned devices by the top provisioner. It should be understood that the number of non-provisioned devices for one provisioner is not as limited above, but may be determined according to device performance and/or application requirements.

I. Equal-Allocation-Based Approach

Given that the top provisioner may provision three non-provisioned devices (for the sake of clear description, hereinafter referred to as the first group of non-provisioned devices) at most, when provisioning a first device in the first group of non-provisioned devices, ⅓ of the total remaining available address space (assuming there are 60,000 addresses) is allocated to the non-provisioned device, that is, 20,000 addresses are allocated to the first device, ⅓ of the remaining addresses are allocated to a second non-provisioned device, and ⅓ of the remaining addresses are allocated to a third non-provisioned device.

Given that the first device in the first group of non-provisioned devices uses three addresses by itself, the number of remaining available addresses is 20,000−3=19,997. Therefore, when the first device served as a primary provisioner provisions three non-provisioned devices (known as the second group of non-provisioned devices), similarly, 19,997/3 addresses may be allocated to a first device in the second group of non-provisioned devices, 19,997/3 addresses may be allocated to a second non-provisioned device and 19,997/3 addresses may be allocated to a third device to be provisioned.

Given that a second device in the first group of non-provisioned devices uses one address by itself, the number of remaining available address is 20,000−1=19,999. Therefore, when the second device is used as a temporary provisioner to provision three non-provisioned devices (known as the third group of non-provisioned devices), similarly, 19,999/3 addresses may be allocated to a first device in the third group of non-provisioned devices, 19,999/3 addresses may be allocated to a second device and 19,999/3 addresses may be allocated to a third device to be provisioned.

In a similar fashion, if a temporary provisioner does not provision three nodes, for example, only provision two nodes, but no other surrounding devices are to be provisioned, the remaining one third of addresses may be released to the top provisioner for subsequent use by other temporary provisioners.

It should be noted that the unicast address range in the standard Bluetooth Mesh protocol is 0x0001 to 0x7FFF, and all other unicast addresses except used by the top provisioner (e.g., mobile phones) may be allocated to the non-provisioned devices.

The inventor noticed that the above approaches can still be improved in specific scenarios:

1. Based on the assumption that each node is finally equipped with three devices, as shown in FIG. 3, the top provisioner only provisions two nodes (i.e., the primary provisioner B and the temporary provisioner A), and then 60,000/3 of the addresses of the top provisioner cannot be allocated, causing the waste of 20,000 unicast addresses.

2. In some embodiments, this approach strictly limits the maximum number of nodes that may be provisioned by each provisioner. In the above example, it is assumed that the maximum number of provisioning nodes for each node in a network is specified as 3. Therefore, when the provisioner has provisioned three nodes, a fourth node cannot be provisioned because no more remain available address can be allocated.

II. Dichotomy-Based Approach

This approach provides a further improvement over the above approach.

According to the present approach, the unicast address range is not evenly allocated each time; instead, ½ of the available address is allocated to the first device, ¼ of the available address is allocated to the second device, ⅛ of the available address is allocated to the third device, 1/16 of the available address is allocated to the fourth device, and so on. Unlike the address allocation in the first approach, in the present approach, the top provisioner allocates ½ (i.e., 30,000 addresses) of the total remaining available address space (i.e., 60,000 addresses) to a first device, ¼ of the addresses (i.e., 15,000 addresses) to a second device, and ⅛ of the addresses (i.e., 7,500 addresses) to a third device when provisioning the first device in the first group of non-provisioned devices.

Given that the first device in the first group of non-provisioned devices uses three addresses by itself, the number of remaining available addresses is 30,000−3=29,997. Therefore, when the first device is used as a primary provisioner to provision three non-provisioned devices (referred as the second group of non-provisioned devices), similarly, 29,997/2 addresses may be allocated to a first non-provisioned device in the second group of non-provisioned devices, 29,997/4 addresses may be allocated to a second non-provisioned device, and 29,997/8 may be allocated to a third address to be provisioned.

Given that the second device in the first group of non-provisioned devices uses one address by itself, the number of remaining available addresses is 15,000−1=14,999. Therefore, when the second device is used as a temporary provisioner to provision three non-provisioned devices (referred as the third group of non-provisioned devices), similarly, 14999/2 addresses may be allocated to a first non-provisioned device in the third group of non-provisioned devices, 14,999/4 addresses may be allocated to a second non-provisioned device, and 14,999/8 addresses may be allocated to a third non-provisioned device.

Similarly, if a temporary provisioner has a remaining available address, but no other surrounding devices are to be provisioned finally, the free address may also be released to the top provisioner or an upper-level temporary provisioner for subsequent use by other nodes.

In step 400, all the temporary provisioners scan their surrounding non-provisioned devices and determine whether there is a non-provisioned device which has not yet accessed the network.

Specifically, in step 300, the determined temporary provisioners (e.g., devices A and B2) are selected to scan their surrounding non-provisioned devices separately. Preferably, the temporary provisioner may determine whether there is a registered device to be provisioned in their surrounding area according to the received configuration information.

In addition, the primary provisioner B determined in step 200 may also scan and determine whether there is a non-provisioned device in its surrounding area.

In addition, the top provisioner may also scan and determine whether there is a non-provisioned device in its surrounding.

In step 500, after the execution of step 400 for a specified time, whether a device to be provisioned is scanned to be obtained or not is determined; if the determination result is "Yes", then proceed to step 600; if the determination result is "No", proceed to step 700.

Specifically, each of the temporary provisioners (e.g., devices A and B2) separately determines whether a device to be provisioned is scanned to be obtained after scanning its surrounding area fora specified time.

For example, as shown in FIG. 3, if the temporary provisioner A start to scan and determines surrounding devices A1, A2 and A3 to be provisioned exist within a specified time, for example, within 10 s, then proceed to step 600.

Similarly, if the provisioner B2 start to scan and determine surrounding devices B2_1 and B2_2 to be provisioned exist within the specified time, for example, 10 s, then proceed to step 600.

If the provisioner A continues to scan but fails to find any non-provisioned device within a specified time, for example, 10 s, it determines that there is no surrounding non-provisioned device, and then proceed to step 700. Similarly, if the temporary provisioner B2 fails to find any non-provisioned device within a specified time, for example, 10 s, it is determined that there is no surrounding non-provisioned device, and then proceed to step 700.

One temporary provisioner may provision a plurality of non-provisioned devices simultaneously. For example, the temporary provisioner may provision devices A1, A2 and A3 to be provisioned simultaneously. For the sake of performance, it is necessary to determine the maximum number of non-provisioned devices for the temporary provisioner, for example, three.

Each non-provisioned device only needs to be provisioned once. Once the provisioning process ends, the device will stop sending the information of "waiting for provisioning" to the surrounding nodes, so that each provisioner, including the temporary provisioner, the primary provisioner and the top provisioner, cannot re-initiate the provisioning process to this device.

The device that has been provisioned either acts as a temporary provisioner to continue to provision other non-provisioned devices, or only acts as an ordinary node in the Bluetooth Mesh network to send, receive and forward information.

If a non-provisioned device receives a request to invite "provisioning" from a plurality of provisioners at the same time, the non-provisioned device itself may choose the provisioner which it intends to accept and reject an invitation request from other provisioners. For example:

(1) the non-provisioned device may select a first provisioner that ask for provisioning which as its own provisioner;

(2) the non-provisioned device may select a provisioner with strong received signal strength indication as its own provisioner; and (3) there may be more interactive information between the non-provisioned device and its provisioner asking for provisioning which, so as to facilitate the device to select the most suitable provisioner as its provisioner.

Each device that has already been provisioned (i.e., a node in a Bluetooth Mesh network) informs the top provisioner or the primary provisioner by the Bluetooth Mesh network of information that it has already access the network, i.e., the provisioning information (e.g., unicast address and other information of each element of this device). Each temporary provisioner may send the provisioning information of all the devices provisioned by itself to the top provisioner or the primary provisioner in a unified manner. The above information may be relayed and forwarded by all relay nodes in the network as the same is transmitted through the Bluetooth Mesh network. In this way, even if the top provisioner or the primary provisioner is far away from the newly provisioned node, the relevant provisioning information will also be received.

In step 600, the temporary provisioner provisions the non-provisioned device scanned in step 500, and determines whether the non-provisioned device becomes a temporary provisioner of a next level. if so, the provisioning information may be sent to the temporary provisioner of a next level.

In this embodiment, as shown in FIG. 3, the temporary provisioner A provisions devices A1, A2, and A3 to be provisioned scanned in step 500; as discussed earlier, the temporary provisioner A may simultaneously provision devices A1, A2, and A3 to be provisioned, enable these devices to join the Bluetooth Mesh network respectively, and determine node addresses of these devices (i.e., unicast addresses) in the Bluetooth Mesh network.

Similarly, as shown in FIG. 3, the temporary provisioner B2 provisions devices B2_1 and B2_2 to be provisioned, which are scanned in step 500, and may sequentially or simultaneously provision devices B2_1 and B2_2 to join the Bluetooth Mesh network respectively and determine node addresses of these nodes (i.e., unicast addresses) in the Bluetooth Mesh network.

For the embodiment shown in FIG. 3, step 600 further includes that temporary provisioners A and B2 decide whether the above non-provisioned devices which have been provisioned by them will be configured as the temporary provisioners of a next level after the completion of provisioning. For example, in one embodiment all the devices A1, A2 and A3 may be determined as the temporary provisioners of a next level (thus referred as temporary provisioners A1, A2 and A3), to which the configuration information will be sent, and the configuration information may include the device identity information (especially the ID information) of each non-provisioned device and/or a unicast address set that may be allocatable by the temporary provisioners A1, A2 and A3, and additional configuration information as described above. It should be understood that the implementation of the present disclosure is not limited as above, and the configuration information may include any information that enables a node as a provisioner to cooperate with a top provisioner. Similarly, both devices B2_1 and B2_2 may be determined as the temporary provisioners of a next level (thus referred as temporary provisioners B2_1 and B2_2), to which the configuration information will be sent, and the configuration information may include the device identity information (especially ID information) of each non-provisioned device and/or a unicast address set allocatable by the temporary provisioners B2_1 and B2_2, and additional configuration information as described above. In this way, the temporary provisioner may determine whether the non-provisioned device has been registered by the device identity information, and perform the provisioning operation on the non-provisioned device to make the device to join the Bluetooth Mesh network and allocate unicast addresses.

Proceed to step 800 after the completion of step 600.

In step 700, the temporary provisioner reports all information of nodes (i.e., the provisioning information of nodes) to the primary provisioner, closes its function as a provisioner and switches to an ordinary Bluetooth Mesh node.

As mentioned above, if the judgment result is "NO" in step 500, proceed to step 700.

Specifically, in step 500, if a certain temporary provisioner makes a determination that a non-provisioned device which has not accessed the network cannot be found within the specified time, for example, within 10 s, the provisioning process which needs to be carried out may be determined to be finished, that is, proceed to step 700. It should be understood that the specified time or specified scanning time used in step 500 is 10 s in the above example, but the implementation of the present disclosure is not limited thereto, and those skilled in the art may select a suitable specified time or specified scanning time of, for example, 10 s to 1 min., e.g., 30 s according to such factors as application scenarios, Bluetooth Mesh network size and communication conditions.

In step 700, the temporary provisioner sends the provisioning information of a node locally stored (i.e., each non-provisioned device) to the primary provisioner; for example, the temporary provisioner A in this embodiment sends the provisioning information of nodes A1, A2 and A3 locally stored to the primary provisioner B; and the temporary provisioner B2 sends the provisioning information of nodes B2_1 and B2_2 locally stored to the primary provisioner B.

Subsequently, the temporary provisioners A and B2 close the functions as provisioners, restore the functions as normal nodes of a Bluetooth Mesh network, and delete all temporary configuration information stored locally.

Proceed to step 800 after the completion of step 700.

In step 800, a determination is made whether the provisioning of the whole Bluetooth Mesh network is finished, and if the determination result is "Yes", then proceed to step 900; if the determination result is "No", proceed to step 400.

As a non-limiting example, the following three approaches are used to determine whether the provisioning of the whole Bluetooth Mesh network is finished:

Approach 1. As previously described in step 700, every temporary provisioner that has completed the provisioning operation needs to send all provisioning information of nodes to the primary provisioner. In this way, if the primary provisioner does not receive any provisioning information of nodes from the temporary provisioner within the specified time, for example, 1 min., it can be determined that all the temporary provisioners have completed the provisioning operation for their surrounding non-provisioned devices, and thus it is determined that the provisioning process of the whole Bluetooth Mesh network is finished.

Approach 2: After determining that all the non-provisioned devices have successfully provisioned, the user informs all the devices that the provisioning of the whole network has finished by the top provisioner and the completed built Bluetooth Mesh network, so that each temporary provisioner stops the function as a provisioner, restores the function as a normal node of the Bluetooth Mesh network, and deletes all temporary configuration information stored locally.

Approach 3: When the user registers the device identity information, that is, in step 100, the user may input the number of non-provisioned devices. In this way, when the number of provisioned nodes (i.e., the non-provisioned device that has completed the provisioning process) received by the top provisioner or the primary provisioner reaches the number of non-provisioned devices input by the user, it can be determined that the provisioning of the whole Bluetooth Mesh network is finished.

In the embodiment shown in FIG. 3, as mentioned above, the provisioning of devices A1, A2, A3, B2_1, B2_2 to be provisioned has been completed in step 600, and each temporary provisioner has reported the provisioning information of nodes locally provisioned to the primary provisioner B in step 700; therefore, the determination result is "Yes", proceed to step 900.

In the embodiment shown in FIG. 3, as mentioned above, only the provisioning of devices A1, A2, A3, B2_1, B2_2 to be provisioned is completed in step 600, and these devices are selected and determined as the temporary provisioners of a next level, and there are many other non-provisioned devices; therefore, if the judgment result is "No", proceed to step 400.

To describe more clearly the Bluetooth Mesh network provisioning method of the present disclosure, a cycle from steps 400 to 800 shown in FIG. 2 will be briefly described with reference to FIG. 3.

As mentioned above, in the embodiment shown in FIG. 3, the temporary provisioners A and B2 select the temporary provisioners A1, A2, A3, B2_1 and B2_2 of a next level in step 600, and sends the configuration information to these devices. Then, proceed to step 800, where a determination is made that the provisioning of the whole network is not completed, then return to step 400.

In step 400, the temporary provisioners A1, A2, A3, B2_1, B2_2 scan the surroundings respectively, and determine the surrounding non-provisioned devices according to the received configuration information, wherein, for example, if the temporary provisioner A1 scans the device A1_1 to be provisioned, then proceed to step 500.

In step 500, the temporary provisioner A1 makes determination that the device A1_1 to be provisioned has been scanned. Then proceed to step 600.

In step 600, the temporary provisioner A1 provisions the device A1_1 to be provisioned, decides the device A1_1 as the temporary provisioner of its next level (therefore, referred as the temporary provisioner A1_1), and sends the configuration information to the device. Then proceed to step 800.

In step 800, a determination is made that the provisioning of the whole Bluetooth Mesh network has not been finished. Then return to step 400.

It should be noted that the execution of steps 500 and 600 in the above cycle is described by taking only the temporary provisioner A1 as an example, but the specific execution is similar to other temporary provisioners mentioned in step 400, and will not be repeated in detail.

It should be noted that only one cycle of steps 400 to 800 has been described above, but in combination with the above cycle and the previous specific description of steps 400 to 800 in the embodiment shown in FIG. 3, those skilled in the art can easily understand the execution process of this cycle, which will not repeated here. It should also be understood that this cycle may be executed in parallel by all temporary provisioners.

In step 900, the primary provisioner summarizes the provisioning information of all nodes, and sends the information to the top provisioner, closing the function as the provisioner.

In this embodiment, as shown in FIG. 3, the primary provisioner B may summarize the node provisioning information received from each temporary provisioner in step 700, and send the information to the top provisioner. Then, the primary provisioner B restores the function as a normal Bluetooth Mesh network node, and deletes all temporary configuration information stored locally.

It should be understood that in the solution of the present disclosure, there is no need to save routing table information, and for a dense network, fast and secure provisioning may still be achieved. In addition, in the solution of the present disclosure, it is not necessary for each node to save the provisioning information of all nodes of the whole network, but each temporary provisioner only needs to allocate and manage the allocatable unicast address set, thus significantly reducing the requirements for the storage space and computing performance of the temporary provisioner.

For example, in a test environment where 100 non-provisioned devices are densely arranged in a room with a one-hop communication distance among them, the test proves that if all the devices are provisioned uniformly by the "top provisioner" according to the prior method, in which the top provisioner provisions three devices at the same time, the result is that it may take 2.5 s on average to provision one device, and thus it may take 250 s to complete the provisioning operation of the network including 100 nodes. By adopting the method disclosed by the present disclosure, the provisioning operation of 100 nodes may be completed within 45 s under the same conditions, that is, the average time for provisioning one device is only 0.45 s, which is 18% of the original time, thus greatly improving the provisioning speed and user experience.

Although various embodiments in different aspects of the present disclosure have been described for the purpose of the present disclosure, it should be understood that the teaching of the present disclosure are not limited thereto. The features disclosed in an embodiment are not limited thereto but may be combined with features disclosed in other embodiments. For example, one or more features and/or operations of the method of the present disclosure described in one embodiment may also be applied separately, in combination or as a whole to another embodiment. It should be further understood that the above-described method steps may be executed sequentially or in parallel, combined into fewer steps, divided into additional steps, or combined and/or eliminated in a different way than that described herein. It should be understood by those skilled in the art that there are still more optional embodiments and variants thereof, and various changes and modifications can be made to the above method steps without departing from the scope defined by the claims of the present disclosure.

The invention claimed is:

1. A method for provisioning a Bluetooth Mesh network, used for provisioning a plurality of non-provisioned devices, so as to add the plurality of non-provisioned devices to the Bluetooth Mesh network, the method comprising the following steps of:
(a) provisioning, by a top provisioner, surrounding non-provisioned devices of the top provisioner, so as to add the surrounding non-provisioned devices to the Bluetooth Mesh network as nodes;
(b) selecting, by the top provisioner, one or more newly added nodes in step (a) to be configured as one or more temporary provisioners;
(c) continuing to perform, by the top provisioner, steps (a) to (b) to process other surrounding non-provisioned devices;
(d) after determination of the one or more temporary provisioners according to step (b), provisioning, by each of the one or more temporary provisioners, surrounding non-provisioned devices of each of the one or more temporary provisioners, so as to add the surrounding non-provisioned devices of each of the one or more temporary provisioners to the Bluetooth Mesh network as nodes;
(e) selecting, by each of the one or more temporary provisioners, one or more newly added nodes in step (d) to be configured as one or more temporary provisioners of a next level; and
(f) repeating steps (d) to (e) for each of the one or more temporary provisioners until completion of the provisioning of the plurality of non-provisioned devices.

2. The method according to claim 1, wherein after the completion of the provisioning of all surrounding non-provisioned devices thereof, each temporary provisioner reports provisioning information of all nodes provisioned by the temporary provisioner to the top provisioner, and the temporary provisioner is converted into an ordinary Bluetooth Mesh node.

3. The method according to claim 1, wherein in step (b), a temporary provisioner provisioned by the top provisioner and supporting a PB-ADV bearer is designated as a primary provisioner after the completion of the provisioning of all surrounding non-provisioned devices thereof, each temporary provisioner reports provisioning information of all nodes provisioned by the temporary provisioner to the primary provisioner, and the temporary provisioner is converted into an ordinary Bluetooth Mesh node; and after completion of the provisioning of the plurality of non-provisioned devices, the primary provisioner sends summarized provisioning information of all nodes to the top provisioner, and the primary provisioner is converted into an ordinary Bluetooth Mesh node.

4. The method according to claim 3, wherein the top provisioner provisions the primary provisioner by means of a PB-GATT bearer or a PB-ADV bearer, and/or the primary provisioner provisions the non-provisioned devices by means of the PB-GATT bearer or the PB-ADV bearer.

5. The method according to claim 4, wherein the top provisioner provisions the primary provisioner by means of a PB-GATT bearer, and the primary provisioner provisions the non-provisioned devices by means of a PB-ADV bearer.

6. The method according to claim 1, further comprising: before step (a), registering device identity information of the plurality of non-provisioned devices with the top provisioner; and in step (a) and step (d), provisioning only the registered non-provisioned devices.

7. The method according to claim 6, wherein registering device identity information of the plurality of non-provisioned devices with the top provisioner comprises one or more of the following steps of:

manually adding Device UUID information of the non-provisioned devices to the top provisioner;

arranging the top provisioner near the non-provisioned devices to obtain the Device UUID information by scanning; and storing, in the top provisioner, a specified pattern to which the Device UUID of the non-provisioned devices conform, and taking the non-provisioned devices whose Device UUIDs conform to the specified pattern as the registered non-provisioned devices.

8. The method according to claim 1, wherein in step (b), the top provisioner sends configuration information to a newly added node, so as to configure the node as a temporary provisioner; and in step (d), sending, by the temporary provisioner, configuration information to the newly added node, so as to configure the node as a temporary provisioner;

wherein the configuration information includes identity information of the plurality of non-provisioned devices and/or a set of unicast addresses allocatable by the node, and wherein the set of unicast addresses allocatable by the node is one of a plurality of disjoint subsets of the set of unicast addresses allocatable by an upper-level provisioner of the node.

9. The method according to claim 7, wherein the top provisioner allocates a set of allocatable unicast addresses equally to the one or more temporary provisioners provisioned by the top provisioner; and/or the temporary provisioner allocates a set of allocatable unicast addresses equally to the one or more temporary provisioners of the next level provisioned by the temporary provisioner.

10. The method according to claim 7, wherein the top provisioner allocates ½ of the set of currently allocatable unicast addresses to a temporary provisioner each time the temporary provisioner is provisioned; and/or the temporary provisioner allocates ½ of the set of currently allocatable unicast addresses to a temporary provisioner of a next level each time the temporary provisioner of the next level is provisioned.

11. The method according to claim 1, wherein when a plurality of temporary provisioners, or the top provisioner and one or more temporary provisioners, initiate provisioning to a same non-provisioned device, the non-provisioned device determines a corresponding provisioner according to one or more of the following:

the time when the provisioning is initiated; and signal strength of the provisioner.

* * * * *